United States Patent
Lee et al.

(10) Patent No.: US 9,670,839 B2
(45) Date of Patent: Jun. 6, 2017

(54) GAS TURBINE APPARATUS

(71) Applicant: Doosan Heavy Industries & Construction Co., Ltd., Changwon-Si, Gyeongsangnam-Do (KR)

(72) Inventors: Sung Ryong Lee, Daegu (KR); Jae Wook Song, Daejeon (KR)

(73) Assignee: DOOSAN HEAVY INDUSTRIES & CONSTRUCTION CO., LTD., Gyeongsangnam-do (KR)

( * ) Notice: Subject to any disclaimer, the term of this patent is extended or adjusted under 35 U.S.C. 154(b) by 439 days.

(21) Appl. No.: 14/222,882

(22) Filed: Mar. 24, 2014

(65) Prior Publication Data

US 2014/0290209 A1    Oct. 2, 2014

(30) Foreign Application Priority Data

Mar. 26, 2013 (KR) .................. 10-2013-0031935

(51) Int. Cl.
| | | |
|---|---|---|
| *F02C 3/10* | (2006.01) | |
| *F02C 3/067* | (2006.01) | |
| *F01D 1/26* | (2006.01) | |
| *F02K 3/04* | (2006.01) | |

(52) U.S. Cl.
CPC .................. *F02C 3/10* (2013.01); *F01D 1/26* (2013.01); *F02C 3/067* (2013.01); *F02K 3/04* (2013.01); *F05D 2210/12* (2013.01); *F05D 2250/44* (2013.01); *Y02T 50/671* (2013.01)

(58) Field of Classification Search
CPC .... F02C 3/10; F02C 3/067; F02C 3/04; F01D 5/03; F01D 1/26; F02K 3/072
See application file for complete search history.

(56) References Cited

U.S. PATENT DOCUMENTS

| 4,159,624 A * | 7/1979 | Gruner | F02C 3/107 60/268 |
|---|---|---|---|
| 5,274,999 A * | 1/1994 | Rohra | F02C 3/067 60/226.1 |
| 7,290,386 B2 * | 11/2007 | Orlando | F01D 1/26 415/65 |

(Continued)

OTHER PUBLICATIONS

Office Action for corresponding European Application No. 14161107.9 dated Mar. 15, 2017.

*Primary Examiner* — Corey Skurdal
(74) *Attorney, Agent, or Firm* — Harness, Dickey & Pierce, P.L.C.

(57) ABSTRACT

A gas turbine apparatus may include one or more driving shafts; a compressor configured to receive power from the one or more driving shafts, suck air, and compress the sucked air at high pressure. The gas turbine may include a combustor configured to mix the compressed air with fuel, and combust the fuel mixture to generate combustion gas. A turbine is connected to the one or more driving shafts and is configured to rotate while the combustion gas passes through the turbine. The turbine may include one or more first turbine blades configured to rotate in a first direction and one or more second turbine blades configured to rotate in a second direction opposite to the first direction. The one or more first turbine blades and the one or more second turbine blades may be alternately arranged along an axial direction of the turbine.

19 Claims, 7 Drawing Sheets

(56) References Cited

U.S. PATENT DOCUMENTS

| | | | |
|---|---|---|---|
| 7,395,657 B2 * | 7/2008 | Johnson | B64D 33/02 244/53 B |
| 2006/0093468 A1 | 5/2006 | Orlando et al. | |
| 2009/0320491 A1 * | 12/2009 | Copeland | F02C 7/277 60/772 |

* cited by examiner

Figure 1

Prior Art

GAS TURBINE APPARATUS

CROSS-REFERENCE TO RELATED APPLICATIONS

This application claims priority to Korean Patent Application No. 10-2013-0031935, filed on Mar. 26, 2013, the disclosure of which is incorporated herein by reference in its entirety.

BACKGROUND OF THE INVENTION

Field of the Invention

Example embodiments relate to a gas turbine apparatus, and more particularly, to a gas turbine apparatus which includes first and second turbine blades rotating in the opposite directions.

Description of the Related Art

In general, a gas turbine apparatus is a kind of turbo machine which directly applies high-temperature and high-pressure combustion gas to turbine blades and rotates a turbine to obtain power.

The gas turbine apparatus has a number of advantages. For example, the gas turbine apparatus can be reduced in size and weight, selectively use various types of fuels, and emit a small amount of pollutant. Thus, the gas turbine apparatus may be applied to various application fields.

Figure 1:
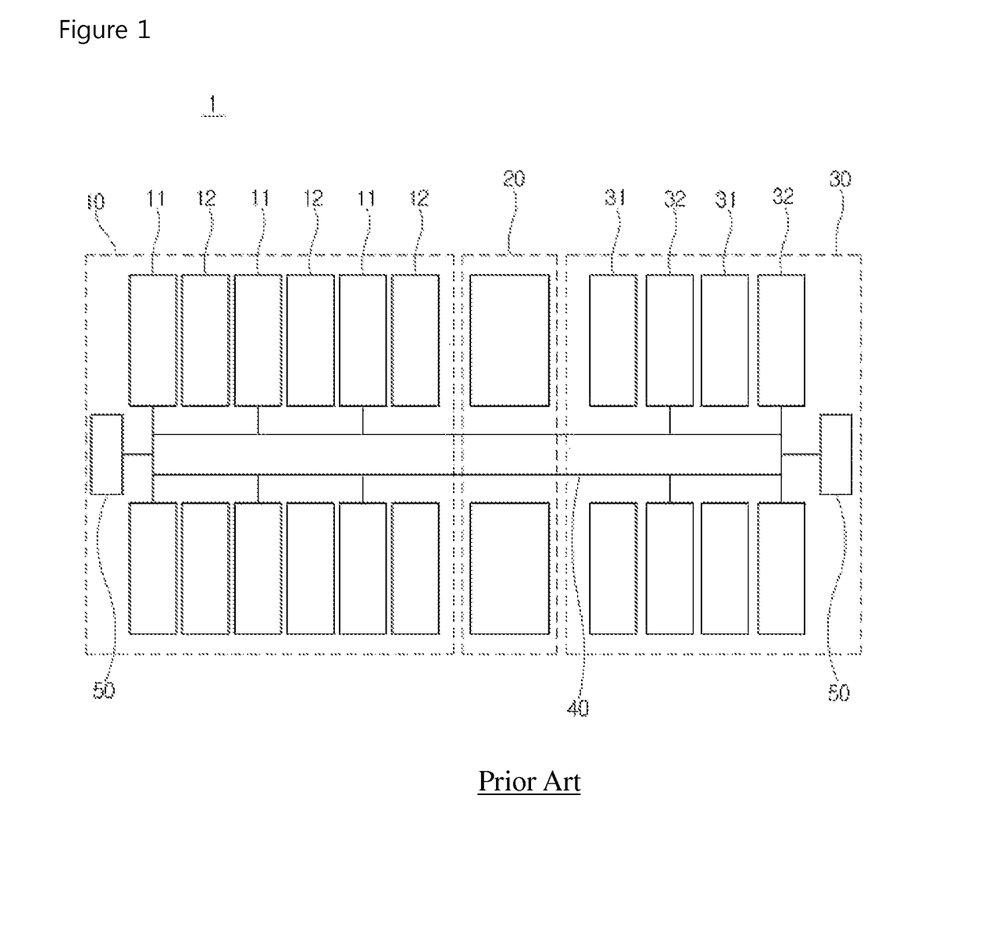
FIG. 1 is a function block diagram illustrating a conventional gas turbine apparatus.

FIG. 1 illustrates a conventional gas turbine apparatus 1. As illustrated in FIG. 1, the conventional gas turbine apparatus 1 basically includes a compressor 10, a combustor 20, and a turbine 30. The compressor 10 sucks and compresses external air, and transfers the compressed air to the combustor 20. The combustor 20 mixes the compressed air transferred from the compressor 10 with fuel, and then combusts the fuel mixture to generate high-temperature and high-pressure combustion gas. The turbine 30 expands the high-temperature and high-pressure combustion gas transferred from the combustor 20 through a turbine blade 32, and converts the expanded gas into a rotational force.

As illustrated in FIG. 2A, the turbine 30 of the gas turbine apparatus 1 includes turbine vanes 31 fixed to a casing 60 and turbine blades 32 connected to a driving shaft 40. The drive shaft 40 includes bearings 50 for rotatably supporting the driving shaft. The turbine vanes 31 and the turbine blades 32 are alternately arranged.

The turbine vane 31 serves to adjust a flow angle of the gas, which is combusted through the combustor and introduced into the turbine 30, and transfer the gas to the turbine blade 32, in a state where the turbine vane 31 is fixed to the casing 60. The turbine vane 31 is disposed between the respective turbine blades 32.

In order to adjust the flow angle of the introduced gas, the turbine vane 31 has a cross-sectional shape of which the central-axis line X-X' is twisted at an angle with respect to the introduced combustion gas.

In general, the cross-sectional shape of the turbine vane 31 is implemented with a fixed blade, an airfoil, that is fixed to the casing 60. Thus, the following descriptions will be based on the turbine vane 31 as a fixed blade having the cross-sectional shape of the airfoil. The turbine blade 32 also has a similar cross-sectional shape, but corresponds to a rotor blade.

As illustrated in FIG. 2B which is a cross-sectional view taken along the central-axis direction X-X', the combustion gas introduced into the turbine 30 from the combustor 20 has a flow direction (a) parallel to the central-axis line X-X'.

While most of velocity components of the introduced combustion gas are parallel to the central-axis line X-X', the introduced combustion gas has almost no velocity components vertical to the central-axis line X-X'.

However, a flow (b) of the introduced combustion gas is twisted at an angle with respect to the central-axis line X-X' by the turbine vane 31 provided at the entrance of the turbine 30.

That is, velocity components vertical to the central-axis line X-X' are added by the turbine vane 31 at the entrance.

The combustion gas (b) having passed through the turbine vane 31 provided at the entrance of the turbine 30 enters the turbine blade 32 while having an angle of attack with respect to the turbine blade 32 disposed in succession to the turbine vane 31.

The turbine blade 32 having an airfoil shape is subjected to a lift force in a direction perpendicular to the central-axis line X-X' by the combustion gas (b) having entered at the angle of attack. Then, the turbine blade 32 is rotated in a direction R indicated in the drawing.

The combustion gas (c) having passed the turbine blade 32 enters the next turbine vane 31 having an airfoil shape at an angle of attack. Then, the above-described process is repeated.

As described above, the turbine 30 of the conventional gas turbine apparatus 1 has a structure in which the turbine vanes 31 serving as fixed blades and the turbine blades 32 serving as rotor blades are alternately arranged.

Furthermore, as shown in FIG. 1, the compressor 10 similarly has compressor blades 11 and compressor vanes 12 alternately arranged.

The conventional gas turbine apparatus having the above-described structure has a problem in that it has a large volume and weight. Furthermore, the gas turbine apparatus has a large pressure loss therein, and such a pressure loss reduces the output of the turbine 30 and the entire efficiency of the gas turbine apparatus.

SUMMARY OF THE INVENTION

At least one embodiment relates to a gas turbine apparatus, which as high efficiency while the volume and weight thereof are reduced.

In one embodiment, a gas turbine apparatus may include one or more driving shafts; a compressor configured to receive power from the one or more driving shafts, sucking air, and compressing the sucked air at high pressure; a combustor configured to mix the compressed air with fuel, and combust the fuel mixture to generate combustion gas; and a turbine connected to the one or more driving shafts and configured to rotate while the combustion gas passes through the turbine. The turbine may include one or more first turbine blades configured to rotate in a first direction and one or more second turbine blades configured to rotate in a second direction opposite to the first direction, and the one or more first turbine blades and the one or more second turbine blades may be alternately arranged in an axial direction of the turbine.

No turbine vane may be provided between the first turbine blade and the second turbine blade.

The one or more driving shafts may include a first driving shaft connected to the first turbine blade and a second driving shaft connected to the second turbine blade.

The first driving shaft may be provided as an inner shaft, and the second driving shaft may be provided as an outer shaft which is disposed to surround at least a portion of the inner shaft.

A rear end of the first turbine blade may be fixed to the first driving shaft, and a front end of the first turbine blade may protrude toward the second driving shaft. A rear end of the second turbine blade may be fixed to the second driving shaft, and a front end of the second turbine blade may protrude toward the first driving shaft.

The first turbine blade may include a first blade part configured to contacted the combustion gas while the combustion gas passes through the first blade part, the second turbine blade may include a second blade part configured to contact the combustion gas having passed through the first blade part while the combustion gas passes through the second blade part, and a distance from a central-axis line of the first driving shaft to the rear end of the first blade part may be substantially equal to a distance from the central-axis line of the first driving shaft to the front end of the second blade part.

The first turbine blade may include a first blade part configured to contact the combustion gas while the combustion gas passes through the first blade part, the second turbine blade may include a second blade part configured to contact the combustion gas having passed through the first blade part while the combustion gas passes through the second blade part, and a distance from the central-axis line of the first driving shaft to the front end of the first blade part may be substantially equal to a distance from the central-axis line of the first driving shaft to the rear end of the second blade part.

The compressor may include one or more first compressor blades configured to rotate in the first direction and one or more second compressor blades configured to rotate in the second direction, and the one or more first compressor blades and the one or more second compressor blades may be alternately arranged along an axial direction of the compressor.

No turbine vane may be provided between the first turbine blade and the second turbine blade.

The first compressor blade may be connected to the first driving shaft, and the second compressor blade may be connected to the second driving shaft.

A rear end of the first compressor blade may be fixed to the first driving shaft and a front end of the first compressor blade may protrude toward the second driving shaft. A rear end of the second compressor blade may be fixed to the second driving shaft and a front end of the second compressor blade may protrude toward the first driving shaft.

The gas turbine apparatus may include a blower fan disposed at the front end of the compressor.

The one or more first turbine blades and the one or more second turbine blades may each include a plurality of turbine blades, respectively, and the one or more driving shafts may include a third driving shaft connecting one of the plurality of second turbine blades to the blower fan.

The one of the plurality of second turbine blades may be provided at the rearmost end in a flow direction of the combustion gas.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF EXAMPLE EMBODIMENTS

Example embodiments will be described below in more detail with reference to the accompanying drawings.

The example embodiments may include various modifications, and thus specific embodiments will be illustrated in the drawings and described in the detailed descriptions. However, the present invention is not limited to specific embodiments, and may include all of modifications, equivalents, and substitutes within the sprit and scope of the present invention.

It will be understood that although the terms first and second are used herein to describe various elements, these elements should not be limited by these terms. These terms are only used to distinguish one element from another element. For example, a first element may be referred to as a second element, and the second element may be referred to as the first element, without departing from the spirit and scope of the invention as defined in the following claims.

When an element is referred to as being connected or coupled to another element, it should be understood that the former can be directly connected or coupled to the latter, or connected or coupled to the latter via an intervening element therebetween. On the other hand, when an element is referred to as being directly connected to another element, it may be understood that no intervening element exists therebetween.

The terms used in this specification are used only to describe specific embodiments, and do not limit the present invention. The terms of a singular form may include plural forms unless referred to the contrary.

In this specification, the meaning of include or comprise specifies a property, a number, a step, a process, an element, a component, or a combination thereof, but does not exclude one or more other properties, numbers, steps, processes, elements, components, or combinations thereof.

Furthermore, all terms used in this specification, including technical or scientific terms, may have the same meanings as terms which are generally understood by those skilled in the art to which the present invention pertains, even though the terms are differently defined. The terms defined in a generally used dictionary may be analyzed to have meanings which coincide with contextual meanings in the related art. As long as the terms are not clearly defined in this specification, the terms may not be analyzed as ideal or excessively formal meanings Furthermore, the following embodiments provide clearer descriptions to those skilled in art. In the drawings, the shapes or sizes of elements may be exaggerated for convenience in description and clarity.

Figure 3:
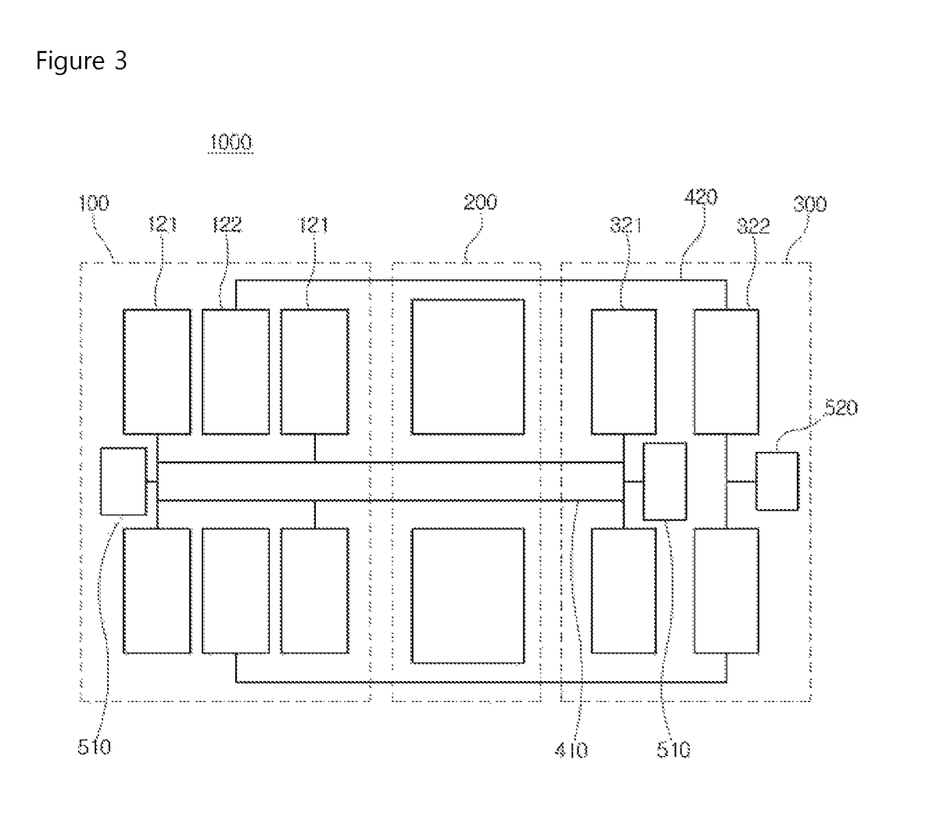
FIG. 3 is a function block diagram illustrating a gas turbine apparatus 1000 according to an embodiment.
Figure 4:
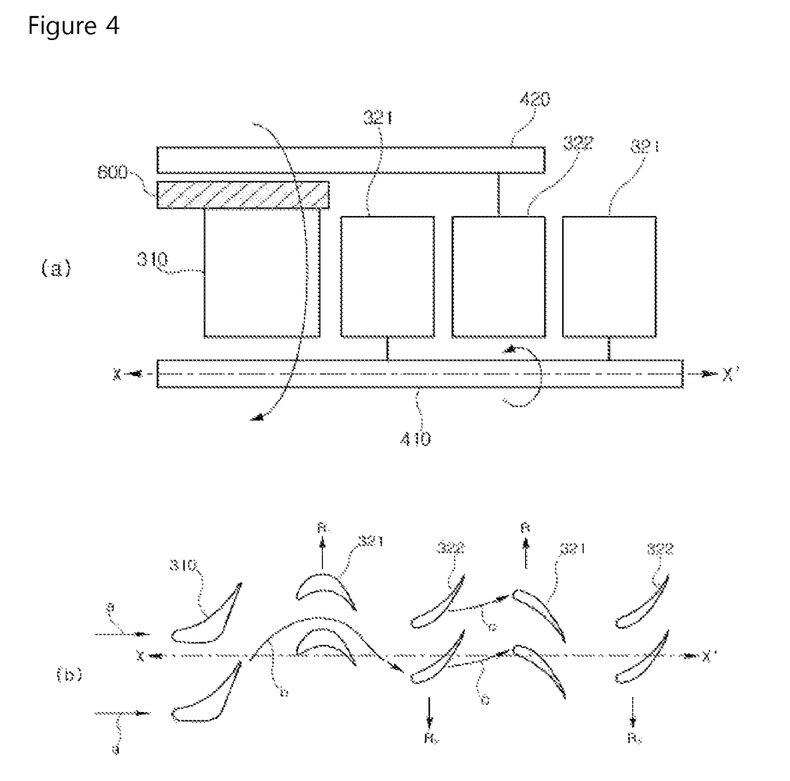
FIG. 4 is a cross-sectional view for explaining a turbine of the gas turbine apparatus illustrated in FIG. 3.

FIG. 3 is a function block diagram illustrating a gas turbine apparatus 1000 according to an embodiment. FIG. 4 is a cross-sectional view for explaining a turbine 300 of the gas turbine apparatus 1000 illustrated in FIG. 3.

Hereafter, the gas turbine apparatus 1000 according to the embodiment will be described with reference to FIGS. 3 and 4.

Referring to FIGS. 3 and 4, the gas turbine apparatus 1000 includes one or more driving shafts (discussed below), a compressor 100, a combustor 200, and a turbine 300. The compressor 100 receives power from the one or more driving shafts and sucks and compresses air. The combustor 200 mixes the compressed air with fuel and combusts the fuel mixture to generate high-temperature combustion gas. The turbine 300 is connected to the one or more driving shafts, and rotated while the high-temperature combustion gas passes through the turbine 300.

The one or more driving shafts are rotating shafts, which are rotated by a rotational force received from the turbine 300, transmit the rotational force to the compressor 100 so as to drive the compressor 100.

As described below, the one or more driving shafts according to the embodiment may include a plurality of driving shafts, each of which may include bearings 510 and 520 for rotatably supporting the driving shaft on a casing 600.

The compressor 100 serves to receive power from the one or more driving shafts and suck and compress air.

The compressor included in the gas turbine apparatus 1000 may be classified into a centrifugal compressor which sucks and compresses air using a centrifugal force of an impeller and an axial compressor which sucks air and compresses the sucked air through blades arranged in a multi-stage on a driving shaft while transferring the sucked air in a direction parallel to the driving shaft.

The compressor according to the embodiment may be either of the centrifugal compressor and the axial compressor, but the following descriptions will be focused on the axial compressor.

The combustor 200 serves to mix the air, compressed at high pressure by the compressor 100, with fuel and combust the fuel mixture to generate high-temperature and high-pressure combustion gas.

The combustor 200 included in the gas turbine apparatus 1000 may be classified into a multiple can-type combustor, a can annular-type combustor, and an annular-type combustor, depending on the internal shape of a combustion chamber. The gas turbine apparatus 1000 according to the embodiment is not limited to any one of the above-described combustors. Depending on the application field of the gas turbine apparatus 1000, any combustor may be properly selected and applied according to the characteristic of the combustor 200.

The turbine 300 serves to expand the gas, combusted at high-temperature and high-pressure by the combustor 200, through turbine blades and convert the expanded gas into a rotational force. The turbine 300 is connected to the one or more driving shafts so as to transmit the rotational force to the one or more driving shafts.

The turbine 300 according to the embodiment includes one or more first turbine blades 321 rotating in a first direction and one or more second turbine blades 322 rotating in a second direction opposite to the first direction. The one or more first turbine blades 321 and the one or more second blades 322 are alternately arranged along an axial direction of the turbine 300.

Although the turbine vane 31 is provided between the respective turbine blades in the conventional gas turbine apparatus, no turbine vane is provided between the first and second turbine blades 321 and 322.

Figure 2:
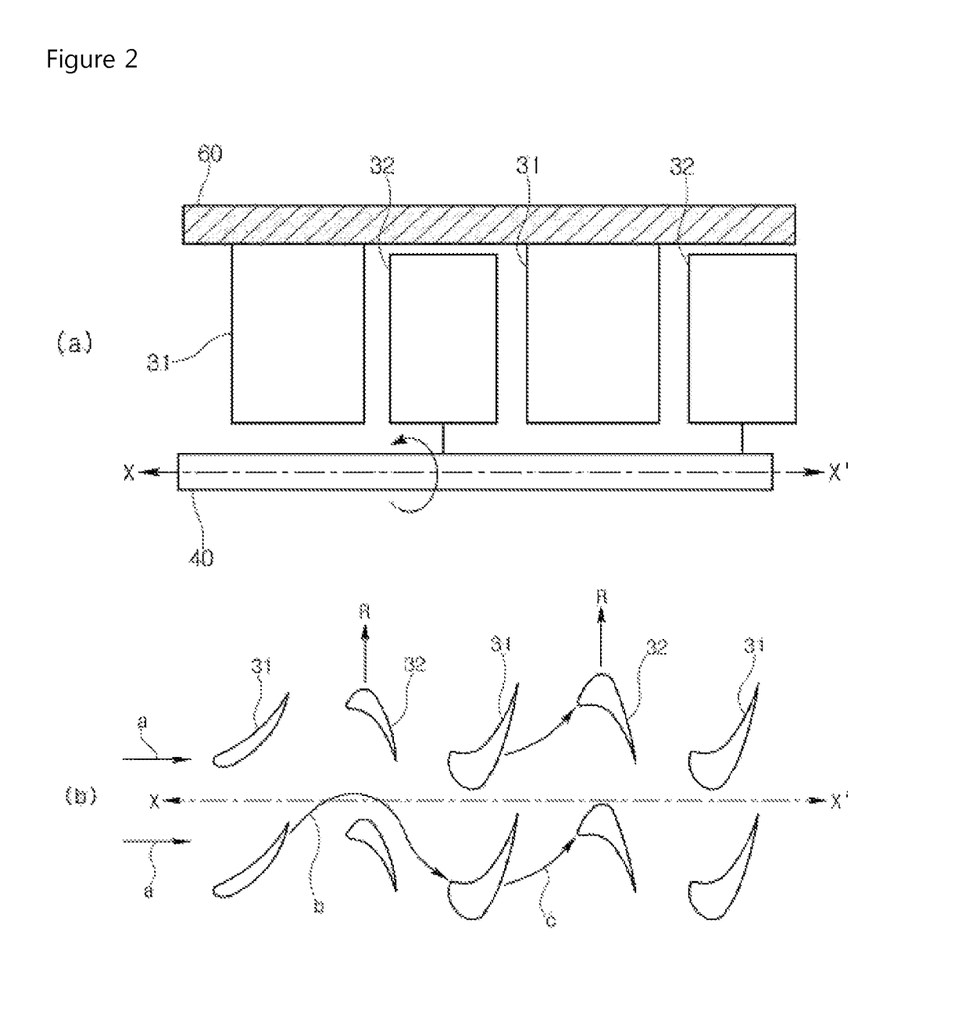
FIG. 2 is a cross-sectional view for explaining a turbine of the gas turbine apparatus of FIG. 1.

That is, the structure in which the turbine vanes 31 and the turbine blades 32 are alternately arranged as illustrated in FIGS. 1 and 2 is replaced with the structure in which the first turbine blades 321 rotating in the first direction and the second turbine blades 322 rotating in the second direction opposite to the first direction are alternately arranged. Thus, it is possible to reduce or minimize a pressure loss which occurs in the turbine vane 31 of the conventional gas turbine apparatus.

In order to extract rotary power from the first and second turbine blades 321 and 322, which rotate in opposite directions to each other, the one or more driving shafts include a first driving shaft 410 connected to the first turbine blades 321 and a second driving shaft 420 connected to the second turbine blades 322.

More specifically, as illustrated in FIG. 4A, the first driving shaft 410 connected to the first turbine blade 321 is provided as an inner shaft, and the second driving shaft 420 connected to the second turbine 322 is provided as an outer shaft disposed to surround the inner shaft and having a hollow shape, which is concentric with the first driving shaft 410.

That is, the first turbine blades 321 and the second turbine blades 322 are alternately arranged between the outer surface of the first driving shaft 410 and the inner surface of the second driving shaft 420.

At this time, the rear end of the first turbine blade 321 is fixed to the first driving shaft 410, or desirably, the outer surface of the first driving shaft 410, and the front end of the first turbine blade 321 protrudes toward the second driving shaft 420, or desirably, the inner surface of the second driving shaft 420. The rear end of the second turbine blade 322 is fixed to the second driving shaft 420, or desirably, the inner surface of the second driving shaft 420, and the front end of the second turbine blade 322 protrudes toward the first driving shaft 410, or desirably, to the outer surface of the first driving shaft 410. That is, the structure having no turbine vanes may be implemented However, one turbine vane 310 may be provided at the upstream side in the flow direction of combustion gas, in order to switch the flow direction of combustion gas which is initially introduced to the turbine 300.

The operation process of the first and second turbine blades 321 and 322 according to the embodiment will be described in detail with reference to FIG. 4B.

Referring to FIG. 4B, the combustion gas introduced into the turbine 300 from the combustor 200 has a flow (a) parallel to a central-axis line X-X'.

While most of velocity components of the introduced combustion gas are parallel to the central-axis line X-X', the introduced combustion gas has no velocity components vertical to the central-axis line X-X'.

However, a flow (b) of the combustion gas having passed through the turbine vane 310 provided at the entrance of the turbine 300 is twisted at an angle (desired or alternatively predetermined) with respect to the central-axis line X-X'.

That is, velocity components vertical to the central-axis line X-X' are added by the turbine vane 310 provided at the entrance of the turbine 300.

The combustion gas (b) having passed through the turbine vane 310 provided at the entrance of the turbine 300 enters the first turbine blade 321, while having a desired (or, alternatively a predetermined) angle of attack with respect to the first turbine blade 321 disposed in succession to the turbine vane 310.

The first turbine blade 321 having an airfoil is subjected to a lift force in a direction vertical to the central-axis line X-X' by the combustion gas having entered at the desired (or, alternatively a predetermined) angle of attack, and then rotated in the first direction R1.

The combustion gas (c) having passed through the first turbine blade 321 enters the second turbine blade 322 while having a desired (or, alternatively a predetermined) angle of attack with respect to the second turbine blade 322 disposed in succession, and is subjected to a lift force in a direction vertical to the central-axis lien X-X' like the first turbine blade. However, the second turbine blade 322 is subjected to a lift force in the opposite direction to the first turbine blade, and rotated in a second direction R2 of FIG. 4B.

That is, the first turbine blade 321 serves as a turbine vane, which corresponds to a fixed blade of the conventional gas turbine apparatus, with respect to the second turbine blade 322.

Then, as the above-described rotation process through the flow of combustion gas is repeated, the second turbine blade 322 serves as a turbine vane for the first turbine blade 321, which is successively disposed in the downstream side in the flow direction of the combustion gas.

As the turbine vane corresponding to the fixed blade of the conventional gas turbine apparatus is replaced with the first or second turbine blade 321, 322 corresponding to a rotor blade, a pressure loss which occurred in the conventional gas turbine apparatus may be reduced or minimized.

Furthermore, as the pressure loss is reduced or minimized, the number of turbine vanes corresponding to fixed blades and the number of turbine blades corresponding to rotor blades may be reduced.

For example, when supposing that the turbine of the conventional gas turbine apparatus uses an arrangement including a total of eight turbine vanes and turbine blades to generate rotary power, the turbine 300 according to the embodiment may decrease the total number of first turbine blades 321 and second turbine blades 322, required to generate the same power, to four or less.

As the number of turbine blades is decreased, an axial dimension may be reduced to thereby implement the gas turbine apparatus 1000 of which the size and weight may be reduced.

As described above, the compressor 100 receives the rotary power from the driving shaft and sucks and compresses air. However, since the driving shaft is divided into the first and second driving shafts 410 and 420, the component for receiving the rotary power from the first and second driving shafts 410 and 420 is divided.

The conventional axial-compressor has a structure in which compressor vanes corresponding to fixed blades and compressor blades corresponding to rotor blades are alternately arranged, like the turbine.

However, the compressor 100 according to the embodiment comprises one or more first compressor blades 121 and one or more second compressor blades 122 as illustrated in FIG. 3, in order to effectively receive rotary power from the first and second driving shafts 410 and 420. The one or more first compressor blades 121 are rotated in the first direction along which the first turbine blade 321 is rotated, and the one or more second compressor blades 122 are rotated in the second direction along which the second turbine blade 322 is rotated. The one or more first compressor blades 121 and the one or more second compressor blades 122 are alternately arranged along an axial direction of the compressor 100.

Like the turbine 300, no compressor vane is provided between the first compressor blade 121 and the second compressor blade 122. The first compressor blade 121 may be connected to the first driving shaft 410, and the second compressor blade 122 may be connected to the second driving shaft 420.

More specifically, the rear end of the first compressor blade 121 is fixed to the first driving shaft 410, the front end of the compressor blade 121 protrudes toward the second driving shaft 420, the rear end of the second compressor blade 122 is fixed to the second driving shaft 420, and the front end of the second compressor blade 122 protrudes toward the first driving shaft 410.

The structure of the compressor 100 may decrease the number of compressor blades for sucking and compressing air in a similar manner to the turbine 300, and reduce the axial dimension of the compressor 100, thereby contributing to the reduction in size and weight of the gas turbine apparatus 1000.

Figure 5:
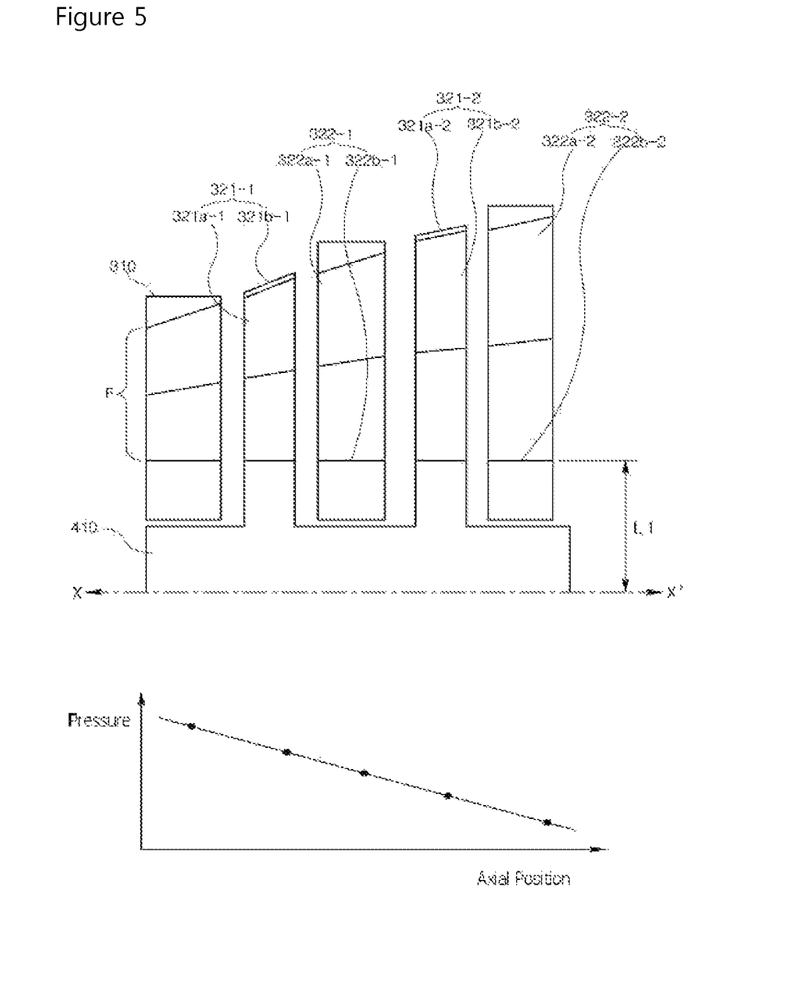
FIGS. 5 and 6 are cross-sectional views for explaining the structure of the turbine according to the embodiment.
Figure 6:
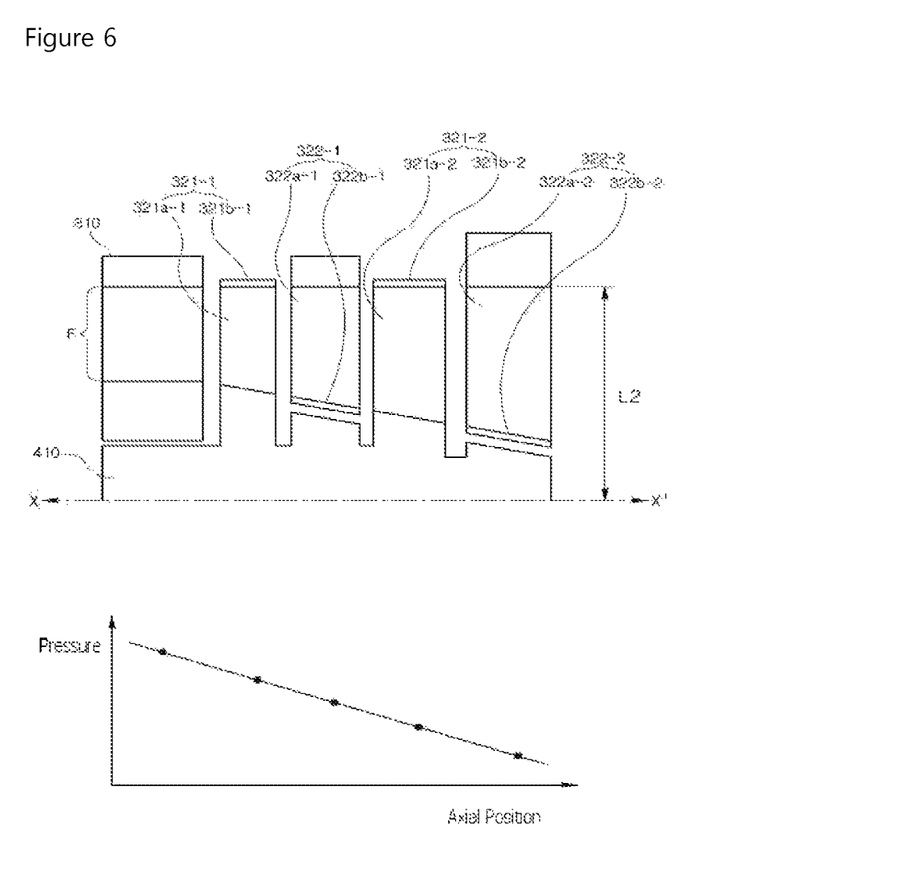

FIGS. 5 and 6 are cross-sectional views for explaining the structure of the turbine 300 according to an embodiment.

As described above, the turbine 300 includes the first and second turbine blades 321 and 322, which are rotated in the opposite directions to each other and alternately arranged along the central-axis line X-X' to extract rotary power from combustion gas.

Thus, as illustrated in FIGS. 5 and 6, the pressure of the combustion gas is gradually decreased while the combustion gas flows along the central-axis line X-X', and the turbine blade disposed in the downstream side of the combustion gas has a larger diameter than the turbine blade disposed in the upstream side, in order to effectively extract power from the combustion gas of which the pressure is decreased.

That is, as the turbine blade disposed in the downstream side of the combustion gas has a larger diameter, a contact area with the combustion gas of which the pressure is decreased may be increased.

However, since the diameter of the turbine blade is set according to the capacity and use of the turbine, the diameter may be limited or restricted. Furthermore, a turbine blade having an excessively large size is not suitable when reducing the size and weight of the compressor.

Considering such a condition, the first turbine blade 321-1 or 321-2 according to the embodiment includes a first blade part 321a-1 or 321a-2, which is contacted with combustion gas while the combustion gas passes through the first blade part 321a-1 or 321a-2; the second turbine blade 322-1 or 322-2 includes a second blade part 322a-1 or 322a-2, which is contacted with the combustion gas having passed through the first blade part 321a-1 or 321a-2 while the combustion gas passes through the second blade part 322a-1 or 322a-2; and a distance from the central-axis line X-X' of the first driving shaft 410 to the rear end of the first blade part 321a-1 or 321a-2 is maintained to be substantially equal to a distance from the central-axis line X-X' of the first driving shaft 410 to the front end of the second blade part 322a-1 or 322a-2.

That is, the width of the blade part of each turbine blade, corresponding to a flow area F with which the combustion gas is contacted while flowing, is gradually increased toward the downstream side along the flow direction of the combustion gas, and a lower limit L1 of the flow area F is constantly maintained.

Such a structure constantly maintains the diameter of the first driving shaft 410. Thus, the structure is suitable for the turbine 300, which provides a large output to generate a large load for the first driving shaft 410 and requires a high RPM.

More specifically, as illustrated in FIG. 5, the rear end of the first blade part 321a-1 of the first first turbine blade 321-1 disposed in succession to the turbine vane disposed at the entrance of the turbine 300 and the front end of the second blade part 322a-1 of the first second turbine blade 322-1 maintain substantially the same distance from the central-axis line X-X'.

Furthermore, the front end of the second blade part 322a-1 of the first second turbine blade 322-1 and the rear end of the first blade part 321a-2 of the second first turbine blade 321-2 disposed in succession maintain substantially the same distance from the central-axis line X-X'.

The above-described structure is applied to the second second turbine blade 322-2 disposed in succession.

In the structure illustrated in FIG. 6, the upper limit L2 of the flow area F is constantly maintained, unlike the structure illustrated in FIG. 5. That is, the width of the blade part of each turbine blade is gradually increased toward the downstream side along the flow direction of the combustion gas, but the upper limit L2 of the flow area is constantly maintained.

For this structure, the first turbine blade 321-1 or 321-2 according to the embodiment includes a first blade part 321a-1 or 321a-2, which is contacted with combustion gas while the combustion gas passes through the first blade part 321a-1 or 321a-2; the second turbine blade 322-1 or 322-2 includes a second blade part 322a-1 or 322a-2, which is contacted with the combustion gas having passed through the first blade part 321a-1 or 321a-2 while the combustion gas passes through the second blade part 322a-1 or 322a-2; and a distance from the central-axis line X-X' of the first driving shaft 410 to the front end of the first blade part 321a-1 or 321a-2 is maintained to be substantially equal to the distance from the central-axis line X-X' of the first driving shaft 410 to the rear end of the second blade part 322a-1 or 322a-2.

Since such a structure constantly maintains the upper limit L2 of the flow area F, the diameter of the turbine 300 may be constantly maintained to contribute to the reduction is size and weight. Furthermore, since the diameter of the first driving shaft 410 may be reduced, the structure is suitable for the low-output turbine 300 having a low RPM.

In order to effectively form the flow area F and prevent combustion gas from leaking to the outside of the flow area F, the first turbine blade 321-1 or 321-2 and the second turbine blade 322-1 or 322-2 may include a first shroud part 321b-1 or 321b-2 and a second shroud part 322b-1 or 322b-2 provided on the front ends thereof, respectively.

Figure 7:
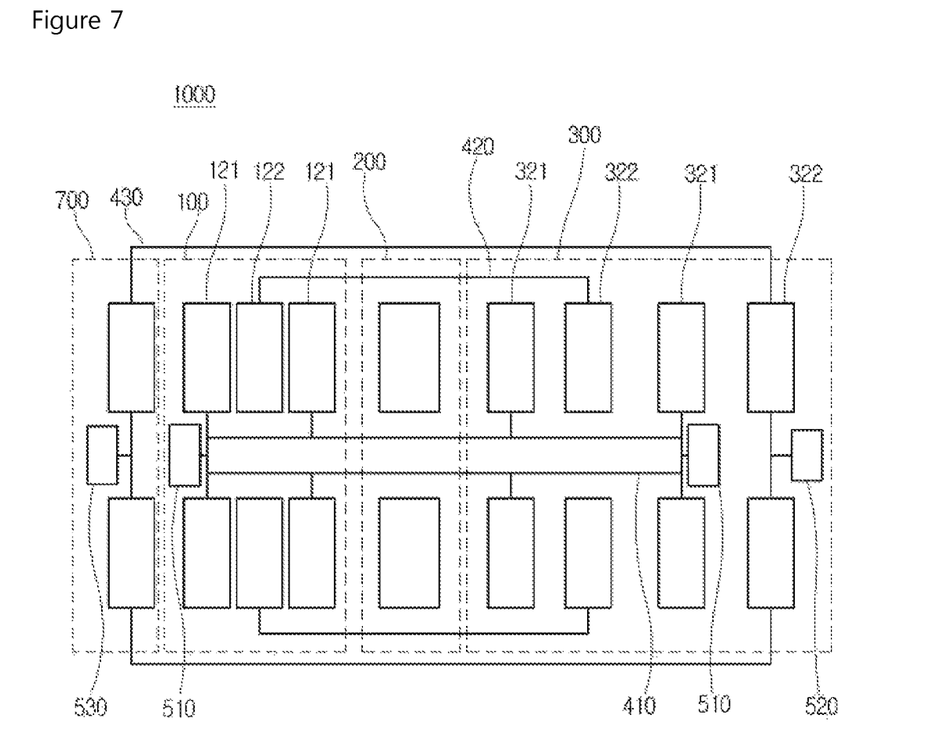
FIG. 7 is a function block diagram illustrating a gas turbine apparatus according to another embodiment.

FIG. 7 is a function block diagram illustrating a gas turbine apparatus 1000 according to another embodiment.

Referring to FIG. 7, the gas turbine apparatus 1000 according to the embodiment further includes a blower fan 700 disposed at the front end of the compressor 100 and a third driving shaft 430 for driving the blower fan 700.

The blower fan 700 serves to increase the amount of air sucked by the compressor 100. Such a structure is suitable for a jet engine which uses combustion gas as a thrust force.

The third driving shaft 430 is connected to the second turbine blade 322 provided at the rearmost end, among the second turbine blades 322, in the flow direction of the combustion direction.

The turbine blade which requires smaller rotary power and generates smaller rotary power than the compressor blades 121 and 122, that is, the second turbine blade 322 provided at the rearmost end among the second turbine blades 322 is used to drive the blower fan 700.

In this case, the third driving shaft 430 which connects the rearmost second turbine blade 322 and the blower fan 700 may be provided separately from the second driving shaft connected to the second turbine blade 322.

In accordance with the embodiments, the gas turbine apparatus includes turbine blades as rotor blades, which play the role of the fixed blades of the conventional gas turbine apparatus, and reduces or prevents a pressure loss which occurred in the turbine vanes of the conventional gas turbine apparatus, thereby increasing efficiency.

The gas turbine apparatus may have no turbine vanes serving as the fixed blades of the conventional gas turbine blades, and may include first and second turbine blades, which are rotated in opposite directions and alternately arranged, thereby reducing the axial dimension of the turbine and contributing to the reduction in size and weight.

While the present invention has been described with respect to the specific embodiments, it will be apparent to those skilled in the art that various changes and modifications may be made without departing from the spirit and scope of the invention as defined in the following claims.

What is claimed is:

1. A gas turbine apparatus comprising:
    a first driving shaft;
    a second driving shaft;
    a compressor configured to receive power from the first and second driving shafts, suck air, and compress the sucked air at high pressure;
    a combustor configured to mix the compressed air with fuel, and combust the fuel mixture to generate combustion gas; and
    a turbine connected to the first and second driving shafts and configured to rotate while the combustion gas passes through the turbine,
    the turbine comprising one or more first turbine blades configured to rotate in a first direction and one or more second turbine blades configured to rotate in a second direction opposite to the first direction,
    the one or more first turbine blades and the one or more second turbine blades being alternately arranged along an axial direction of the turbine,
    the first driving shaft connected to each of the first turbine blades and the second driving shaft connected to each of the second turbine blades,
    the first turbine blade including a first blade part having a rear end,
    the second turbine blade including a second blade part having a front end, and
    a distance from a central-axis line of the first driving shaft to the rear end of the first blade part is substantially equal to a distance from the central-axis line of the first driving shaft to the front end of the second blade part.

2. The gas turbine apparatus according to claim 1, wherein no turbine vane is provided between the first turbine blade and the second turbine blade.

3. The gas turbine apparatus according to claim 1, wherein the first driving shaft is provided as an inner shaft, and the second driving shaft is provided as an outer shaft surrounding at least a portion of the inner shaft.

4. The gas turbine apparatus according to claim 3, wherein
    a rear end of the first turbine blade is fixed to the first driving shaft, and a front end of the first turbine blade protrudes toward the second driving shaft, and a rear end of the second turbine blade is fixed to the second driving shaft, and a front end of the second turbine blade protrudes toward the first driving shaft.

5. The gas turbine apparatus according to claim 4, wherein the first blade part is configured to contact the combustion gas while the combustion gas passes through the first blade part, and the second turbine blade is configured to contact the combustion gas having passed through the first blade part while the combustion gas passes through the second blade part.

6. The gas turbine apparatus according to claim 4, wherein a distance from a central-axis line of the first driving shaft to the front end of the first blade part is substantially equal to a distance from the central-axis line of the first driving shaft to the rear end of the second blade part.

7. The gas turbine apparatus according to claim 3, wherein the compressor comprises one or more first compressor blades configured to rotate in the first direction and one or more second compressor blades configured to rotate in the second direction, and the one or more first compressor blades and the one or more second compressor blades are alternately arranged in an axial direction of the compressor.

8. The gas turbine apparatus according to claim 7, wherein no vane is provided between the first compressor blade and the second compressor blade.

9. The gas turbine apparatus according to claim 7, wherein the first compressor blade is connected to the first driving shaft, and the second compressor blade is connected to the second driving shaft.

10. The gas turbine apparatus according to claim 7, wherein
a rear end of the first compressor blade is fixed to the first driving shaft and a front end of the first compressor blade protrudes toward the second driving shaft, and
a rear end of the second compressor blade is fixed to the second driving shaft and a front end of the second compressor blade protrudes toward the first driving shaft.

11. The gas turbine apparatus according to claim 1, further comprising:
a blower fan disposed at the front end of the compressor.

12. The gas turbine apparatus according to claim 11, wherein
the one or more first turbine blades comprise a plurality of first turbine blades;
the one or more second turbine blades comprise a plurality of second turbine blades; and
the apparatus further comprises a third driving shaft connecting one of the plurality of second turbine blades to the blower fan.

13. The gas turbine apparatus according to claim 12, wherein the one of the plurality of second turbine blades is provided at the rearmost end in a flow direction of the combustion gas.

14. A gas turbine apparatus comprising:
a first driving shaft;
a compressor configured to be driven by the first driving shaft;
a combustor configured to combust a fuel mixture of fuel and air compressed by the compressor;
a plurality of first turbine blades configured to be driven by the first driving shaft and expanding combustion gas from the combustor;
a plurality of second turbine blades configured to further expand combustion gas from the first turbine blades; and
a second driving shaft supporting the second turbine blades, and configured to rotate in an opposite direction to rotation of the first driving shaft, and the second driving shaft having a space for receiving the first turbine blades therein,
the first driving shaft connected to each of the first turbine blades and the second driving shaft connected to each of the second turbine blades,
each of the first turbine blades including a first blade part having a rear end,
each of the second turbine blades including a second blade part having a front end, and
a distance from a central-axis line of the first driving shaft to the rear end of the first blade part is substantially equal to a distance from the central-axis line of the first driving shaft to the front end of the second blade part.

15. The gas turbine apparatus of claim 14, wherein the second driving shaft is concentrically disposed with the first driving shaft.

16. The gas turbine apparatus of claim 14, wherein the compressor includes:
a plurality of first compressor blades configured to be driven by the first driving shaft; and
a plurality of second compressor blades configured to further compress air from the first compressor blades and engage with the second driving shaft.

17. The gas turbine apparatus of claim 14, further comprising:
a blower fan disposed at the front end of the compressor.

18. The gas turbine apparatus according to claim 17, further comprising:
a third driving shaft connecting one of the plurality of second turbine blades to the blower fan.

19. The gas turbine apparatus according to claim 18, wherein the one of the plurality of second turbine blades is provided at the rearmost end in a flow direction of the combustion gas.

* * * * *